June 17, 1952  G. A. LYON  2,600,411
WHEEL COVER
Filed Sept. 10, 1951  2 SHEETS—SHEET 1
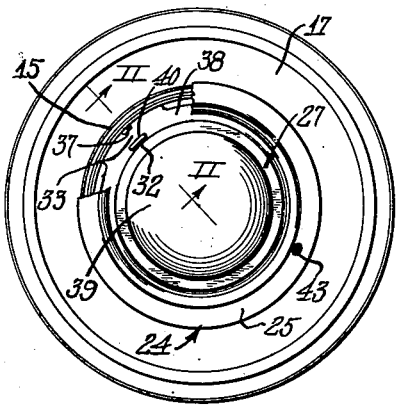
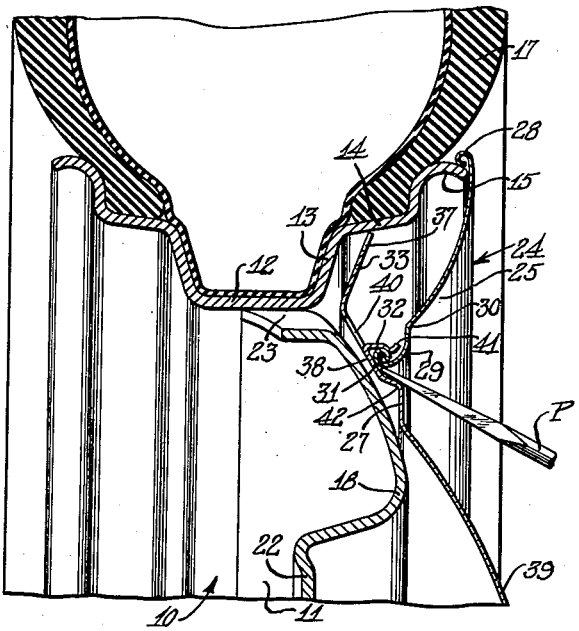
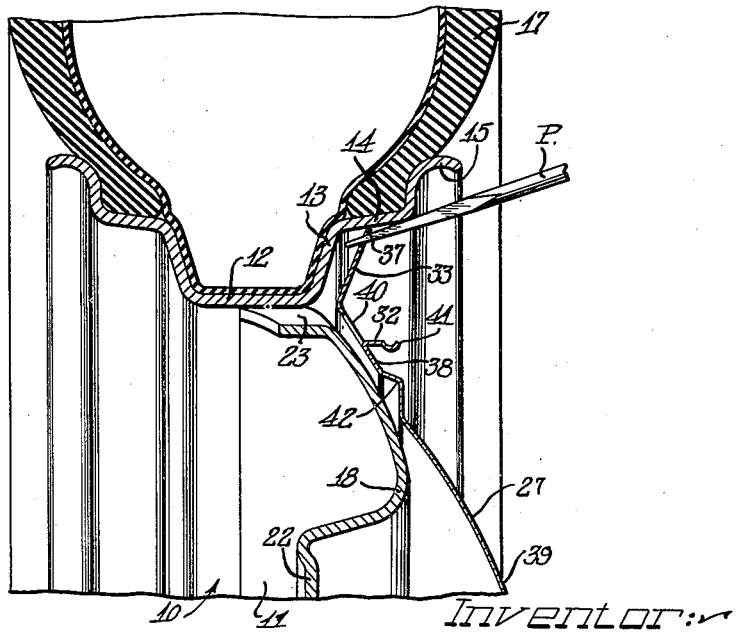
Inventor:
George Albert Lyon June 17, 1952  G. A. LYON  2,600,411
WHEEL COVER
Filed Sept. 10, 1951  2 SHEETS—SHEET 2

Inventor:
George Albert Lyon
by Hill, Sherman, Meroni, Gross & Simpson
Attys

Patented June 17, 1952

2,600,411

UNITED STATES PATENT OFFICE 2,600,411

WHEEL COVER

George Albert Lyon, Detroit, Mich.

Application September 10, 1951, Serial No. 245,937

17 Claims. (Cl. 301—37)

This invention is directed to an improved wheel structure and relates more particularly to a new and improved cover assembly therefor.

The application is a continuation-in-part of my copending applications, Serial No. 717,348, filed December 20, 1946 now abandoned, and Serial No. 776,973, filed September 30, 1947.

An important object of this invention is to provide a wheel structure having an improved cover assembly including novel retaining means for snap-on pry-off retention of the cover in concealing relation to a portion of the wheel.

Another object of the invention is to provide an improved wheel structure and cover assembly therefor wherein a novel retaining member is adapted to be mounted upon the wheel to maintain a trim ring cover member in snap-on pry-off mounted relationship with respect to the wheel.

A further object of the invention is to provide an improved retaining member structure for a wheel cover assembly.

In accordance with the general features of my invention, there is provided a wheel structure having a tire rim of the drop center type formed with a plurality of stepped flanges and a central load bearing portion secured to the base flange of the tire rim, a cover for the outer side of the wheel structure including a member disposed in concealing relation to the tire rim and extending generally axially and radially inwardly and having a beaded inner edge, and a retaining member wedgingly engaging the tire rim and having thereon axially outwardly extending retaining clip members engageable in snap-on pry-off relationship by the inner beaded edge of the cover member for retaining the cover member removably in place on the wheel, the retaining member in the portion thereof radially inwardly from the area of engagement by said beaded cover edge being formed to facilitate the insertion of a pry-off tool between the retaining member and the beaded cover edge for prying the beaded cover edge free from said retaining clips.

According to other features of the invention, the retaining member is formed with a radially inner generally axially outwardly protruding shoulder spaced from the area of engagement of the retaining member by the beaded cover edge and engageable by the pry-off tool as a fulcrum to afford leverage for the tool.

It is also a feature of the invention to have the cover retaining clips on the retaining member struck out integrally therefrom and with the apertures from which the clips are struck concealed behind the cover.

Other objects, features and advantages of the present invention will be readily apparent from the following detailed description of a preferred embodiment and modifications thereof taken in conjunction with the accompanying drawings, in which:

Figure 1 is a side elevational view of a vehicle wheel carrying a cover according to the present invention, with a portion of the cover broken away to reveal certain details of the structure;

Figure 2 is a radial sectional view of an enlarged scale taken substantially along the line II—II of Figure 1;

Figure 3 is a view similar to Figure 2, but with the cover member removed and illustrating the removal of the retaining member by a pry-off tool;

As shown on the drawings:

Figure 4:
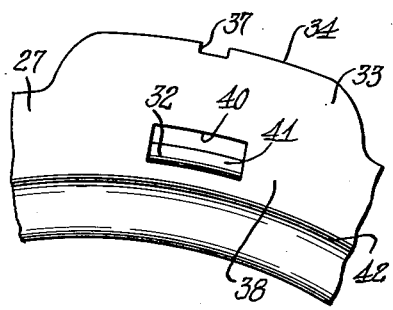
Figure 4 is a fragmentary enlarged face view of a portion of the retaining member.

The present invention is particularly adapted for use with a vehicle wheel such as an automobile wheel, including a tire rim 10 and a load-sustaining body part 11 both of which may be suitably formed from sheet metal of appropriate gauge. The tire rim 10 includes a base flange 12 to which the body part 11 is secured, side flanges 13, intermediate flanges 14 and terminal side flanges 15, the flanges cooperating at the opposite sides of the rim to provide therebetween a channel within which a tire and tube assembly 17 is accommodated. The wheel body is formed with an intermediate axial outward bulging annular nose portion 18 upon which is adapted to seat a hub cap 19, Figures 4 and 6, which is held by retaining means such as radially inwardly extending retaining bumps 20 on the nose 18 and engageable by a beaded edge 21 on the hub cap, Figures 4 and 6. A central dished portion of the wheel body provides a bolt-on flange 22 which is adapted to be secured to a part of the vehicle axle as by means of cap screws or bolts (not shown).

Between the flanges of the outer side of the tire rim 10 and the nose portion 18 of the body is the usual relatively deep and wide groove which when fully exposed to view presents a notoriously rather ugly appearance and due to the angular utilitarian configuration thereof has a number of dirt catching and accumulating grooves and recesses. In addition, the juncture between the tire rim and the wheel body customarily shows ventilation openings 23.

For concealing the flanged outer side of the tire rim 11 and the juncture of the tire rim and the wheel body 11, an improved ornamental cover assembly 24 is provided. This assembly includes a cover member 25 and a retaining member 27 which are constructed and arranged for snap-on pry-off assembly and disassembly, the retaining member 27 being constructed to be attached to the wheel, and the cover member 25 being constructed to be attached to the retaining member and the wheel.

The cover member 25 is preferably of a radial magnitude and extent to conceal the outer side of the tire rim fully and also a substantial radially outer portion of the retaining member 27. To this end, the cover member 25 is formed as an annulus of a suitable material such as sheet metal and with a cross sectional contour convexly rounded in general semblance of the rounded side wall contour of the tire 17 and of a width to extend generally radially inwardly and axially inwardly from the tire rim marginal flange 15 to a point adjacent the radially outer side of the nose portion 18 of the wheel body radially inwardly from the juncture of the wheel body with the tire rim. A reinforced smoothly finished outer edge is afforded for the wheel cover 25 by a bead 28 of relatively small diameter and located to encircle the radially outer side of the margin of the tire rim flange 15 closely adjacent the juncture of the tire with the flange. This substantially conceals such juncture and enhances the pleasing ornamental effect of the cover as forming a radially inner side wall continuation of the tire. Where the outer surface of the cover 25 is of light color or colored white, it will appear as a white side wall portion of the tire.

The inner marginal portion of the cover member 25 is preferably formed with a relatively large radius, generally axially outwardly protruding annular hump 29 affording a rigidifying, generally axially inwardly projecting juncture rib 30 with the main body portion of the cover. The outer edge of the annular hump 29 is formed with a relatively tightly curled reinforcing bead 31 projecting generally axially inwardly and radially outwardly behind the hump 29. Through this formation, the reinforcing bead 31 and the marginal hump 29 have a certain degree of resilience in generally radial direction adapting the bead for ready snap-on pry-off assembly with clips 32 on the retaining member 27.

According to the present invention, the retaining member 27 is formed for wedging attachment engagement with the outer intermediate flange 14 of the tire rim and to be retained in such relationship to the wheel components. To this end, the retaining member 27 is formed generally circular and with generally radially outwardly and slightly axially outwardly inclined outer marginal retaining fingers 33 which may be in suitably spaced circumferential series and in any preferred number such as three, four or five, four having been found well suited for the purpose.

The retaining fingers 33 are preferably relatively broad to afford biting edges 34, Figure 4, of substantial peripheral extent to afford strong wedging, biting engagement with the radially inner side of the tire rim flange 14 when the retaining member 27 is mounted upon the wheel. This is effected by disposing the retaining member or the cover assembly in substantial concentricity within the tire rim and pressing axially inwardly until the retaining member is fully assembled. Although the retaining fingers 33 will hold the retaining member quite thoroughly in assembly with the wheel and effectively resist accidental dislodgement, they can be released relatively easily by the insertion of a pry-off tool P, Figure 3, within preferably medially formed notches 37 in the respective edges 34 thereof.

Radially inwardly from the retaining fingers 33, the retaining member 27 is formed with a disk-like body having an annular portion 38 extending in a plane generally radially inwardly and axially outwardly, substantially parallel to the general direction of slope of the opposing portion of the wheel body and a central portion 39 bulging convexly axially outwardly, the retaining member concealing and substantially covering the wheel body part 11. From the retaining ring annular portion 38, the cover retaining clips 32 are preferably integrally struck out in radial, centered alignment with the retaining fingers 33 since in those areas of the retaining member the respective strike-out apertures, identified at 40, formed in the retaining member body are least likely to weaken the body.

By preference, the retaining clips 32 are integral with the radially inner sides of the respective apertures 40 and are bent to extend axially outwardly and slightly radially inwardly to provide generally radially and slightly axially inwardly facing shoulders behind which the cover bead 31 is adapted to be snapped in assembly by pressing the cover 25 axially inwardly. The axially outer extremities of the clips 32 are respectively formed with lead-in cam portions 41.

The inherent resiliency of the metal of the retaining clips 32 and the resiliency of the cover bead 31 may be only slight and the deflectability relatively stiff for efficient retaining interaction. Either the clips or the cover bead may be somewhat resilient and the other relatively rigid. The stiffness of the retaining clips 32 may be enhanced by forming of the same on a slight transverse radius as shown in Figure 4 substantially complementary to the radially inner circumferential curve of the cover bead 31. As a result, the cover member 25 can be assembled with the retaining member 27 by snapping it in place with respect to the retaining fingers 32.

As a further result of the resilient, snap-on assembly of the cover components, disassembly thereof may be effected by prying the beaded inner margin of the cover member 25 free from the retaining engagement of the retaining fingers 32. To implement this, the retaining member 27 is preferably formed in such a manner as to afford pry-off tool access clearance between the radially inner side of the cover marginal bead 31 and the contiguous portion of the retaining member substantially as shown in Figure 2.

In addition, a generally axially outwardly protruding reinforcing and pry-off rib or shoulder 42 is formed on the radially inner portion of the retaining member 27, radially inwardly spaced from the inner margin of the hump 29 of the cover, to afford a fulcrum for pry-off leverage through the medium of the pry-off tool P. The reinforcement afforded by the annular rib 42 effectively sustains the annular portion 38 of the retaining member 27 against deformation or other damage from manipulation of the pry-off tool. The annular portion 38 and hub portion 39 of the retaining member 27, where it is exposed to view, may be appropriately colored in contrast to the cover member 25 or it may be polished or plated as desired.

The axially inward fully mounted disposition of the retaining fingers 32 is preferably such that in the fully assembled relationship of the cover 25 with the member 27 and in the fully axially inwardly pressed mounted, retaining disposition of the retaining member 27 with regard to the wheel structure, the cover 25 is maintained under sufficient axial inward tension to maintain the outer margin thereof in tight, rattle-free, dirt excluding engagement with the tire rim terminal flange 15. This feature is enhanced by having the annular portion 38 of the retaining member 27 normally spaced from the body of the wheel, or at least originally constructed to be thus mounted upon the wheel whereby appropriate axial adjustment of the retaining member 27 in mounting the same upon any particular wheel will procure the proper tensioning of the cover member 25, irrespective of substantial variance in the relative axial assembled relationship of the tire rim 10 and the wheel body 11. Thus, in a wheel where the wheel body 11 is disposed further axially outwardly than predetermined standards, the difference will be readily accommodated by closer disposition of the annular portion 38 of the retaining member 27 to the wheel body. Where the wheel body 11 is disposed axially inwardly out of standard, a greater spacing between the wheel body and the annular portion of the retaining member accommodates the difference.

Hence the cover assembly of the present invention is quite versatile and adaptive in use and may be installed as factory equipment of the vehicle or may be applied to wheels of vehicles already in service. It will be observed that no alteration in existing wheel design is necessary to accommodate the present cover assembly.

Access to the customary valve stem of the tire assembly 17 is facilitated by having an aperture 43 in the cover 25 through which the stem may protrude.

Figure 5:
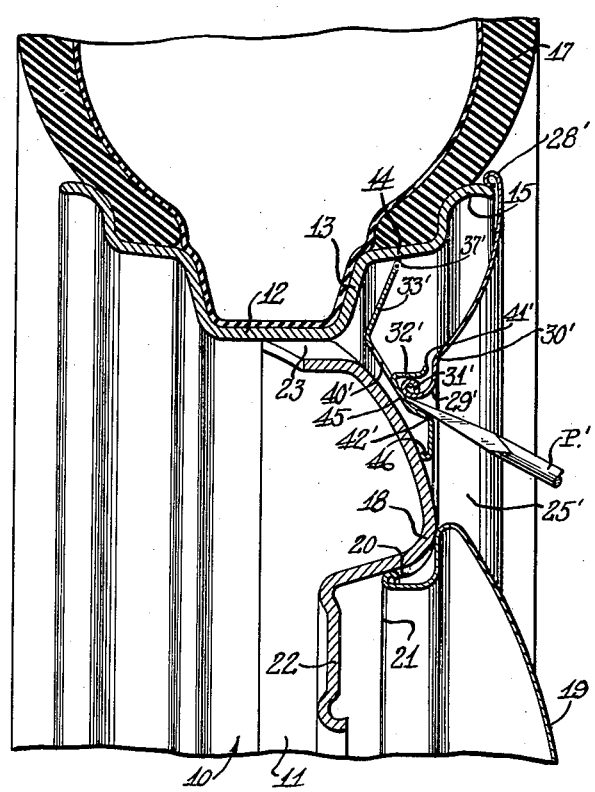
Figure 5 is a radial sectional view similar to Figure 2, but showing a modification of the invention.

The cover member of the modification of Figure 5 is identical with that of Figure 2, as are the retaining member fingers. The manner of engaging the cover member with the retaining member is also the same. The similar parts in Figure 5 have therefore been designated with a prime mark and the numeral designating the similar part in the description of the embodiment of Figure 2. For a description of these parts in Figure 5, reference is made to the description of Figure 2.

The mounting of the retaining ring 45 of the modification of Figure 5 is effected by disposing the retaining member 45 in substantial concentricity within the groove between the tire rim and the nose portion 18 and pressing axially inwardly until the retaining member is fully assembled by engagement of a radially inner portion thereof, such as an inner marginal underturned reinforcing and abutment flange 46, with the wheel body and the radially outer side of the nose portion 18.

Radially inwardly from the retaining fingers 33', the retaining member 45 is formed with an annular body of substantial width and extending in a plane generally radially inwardly and axially outwardly, substantially parallel to the general direction of slope of the opposing portion of the wheel body. From the retaining ring body, the cover retaining clips 32' are preferably integrally struck out in radial, centered alignment with the retaining fingers 33' since in those areas of the retaining member the respective strike-out apertures, identified at 40', formed in the retaining member body are least likely to weaken the body.

By preference, the retaining clips 32' are integral with the radially inner sides of the respective apertures 40' and are bent to extend axially outwardly and slightly radially inwardly to provide generally radially and slightly axially inwardly facing shoulders behind which the cover bead 31' is adapted to be snapped in assembly by pressing the cover 25' axially inwardly. The axially outer extremities of the clips 32' are respectively formed with lead-in cam portions 41'.

As a result of the resilient, snap-on assembly of the cover components, disassembly thereof may be effected by prying the beaded inner margin of the cover member 25' free from the retaining engagement of the retaining fingers 32'. To implement this, the retaining member 45 is preferably formed in such a manner as to afford pry-off tool access clearance between the radially inner side of the cover marginal bead 31' and the contiguous portion of the retaining ring substantially as shown in Figure 2.

In addition, a generally axially outwardly protruding reinforcing and pry-off rib or shoulder 42' is formed on the radially inner portion of the retaining ring 45, radially inwardly spaced from the inner margin of the hump 29' of the cover, to afford a fulcrum for pry-off leverage through the medium of a suitable pry-off tool P'. The reinforcement afforded by the annular rib 42' and the underturned inner marginal reinforcing and refinishing flange 46, effectively sustain the inner marginal portion of the retaining ring 45 against deformation or other damage from manipulation of the pry-off tool. The inner marginal portion of the retaining ring 45 where it is exposed to view may be appropriately colored in contrast to the cover member 25' or it may be polished or plated as desired.

The axially inward fully mounted disposition of the retaining fingers 32' is preferably such that in the fully assembled relationship of the cover 25' with the trim ring 45 and in the fully axially inwardly pressed mounted, retaining disposition of the retaining ring 45 with regard to the wheel structure, the cover 25' is maintained under sufficient axial inward tension to maintain the outer margin thereof in tight, rattle-free, dirt excluding engagement with the tire rim terminal flange 15. This feature is enhanced by having the body of the retaining ring 45 intermediate the retaining fingers 33' and the body-engaging flange 46 normally spaced from the body of the wheel, or at least, originally constructed to be thus mounted upon the wheel whereby appropriate axial adjustment of the retaining ring 45 in mounting the same upon any particular wheel will procure the proper tensioning of the cover member 25', irrespective of substantial variance in the relative axial assembly relationship of the tire rim 10 and the wheel body 11. Thus, in a wheel where the wheel body 11 is disposed further axially outwardly than predetermined standards, the difference will be readily accommodated by closer disposition of the body of the retaining ring 45 to the wheel body. Where the wheel body 11 is disposed axially inwardly out of standard, a greater spacing between the wheel body and the body of the retaining ring accommodates the difference.

Figure 6:
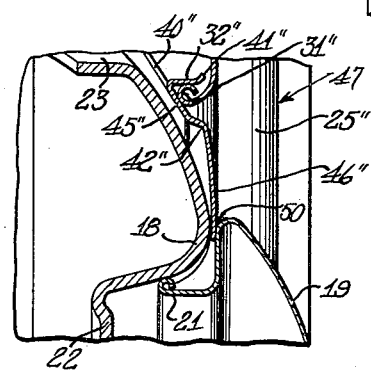
Figure 6 is a fragmentary cross sectional view similar to a portion of Figure 4, showing a further modification of the invention.

In Figure 6 I have illustrated a further modification of the invention wherein the cover assembly 47 corresponds identically with the cover assembly shown in Figure 5, with the exception that the inner margin 46″ of the cover assembly is extended radially inward so as to be clamped at 50 by the hub cap 19 to the nose portion 18 of the wheel body. Double primed numerals refer to parts similar to those in Figure 5.

The advantage of this modification of the invention resides in the fact that the hub cap 19 is also utilized in clamping part of the cover assembly in the wheel. In addition, it enables the wheel body to be decorated by the cover assembly clear to the outer edge of the hub cap 19.

It should be noted that the same reference numerals are employed on the wheel parts and on the hub cap in the modifications as these elements are identical to those of the preferred form.

Cross reference is made to my copending application Serial No. 66,930, filed December 23, 1948, which is entitled to an effective date prior to the earliest effective date of the present application and contains broadly dominating claims to the pry-off rib feature disclosed herein.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a wheel structure having a tire rim of the drop center type formed with a plurality of stepped flanges and a central load bearing portion secured to the base flange of the tire rim, a cover for the outer side of the wheel structure including a trim ring member disposed in substantially concealing relation to the tire rim and extending generally axially inwardly and radially inwardly and having a beaded inner edge, and a retaining member wedgingly engaging the tire rim and having thereon concealed behind said trim ring member axially outwardly extending retaining clips engageable in snap-on pry-off relationship by the inner beaded edge of the trim ring member for retaining the trim ring member removably in place on the wheel, the retaining member in the portion thereof radially inwardly from the area of engagement by said beaded trim ring edge being formed to facilitate the insertion of a pry-off tool between the retaining member and the beaded trim ring edge for prying the beaded trim ring edge free from said retaining clips.

2. In a wheel structure having a tire rim of the drop center type formed with a plurality of stepped flanges and a central load bearing portion secured to the base flange of the tire rim, a cover for the outer side of the wheel structure including a trim ring member disposed in substantially concealing relation to the tire rim and extending generally axially inwardly and radially inwardly and having a beaded inner edge, and a retaining member wedgingly engaging the tire rim and having thereon axially outwardly extending retaining clips engageable in snap-on pry-off relationship by the inner beaded edge of the trim ring member for retaining the trim ring member removably in place on the wheel, the retaining member in the portion thereof radially inwardly from the area of engagement by said beaded trim ring edge extending generally axially outwardly and providing a gap to facilitate the insertion of a pry-off tool between said portion of the retaining member and the beaded trim ring edge for prying the beaded trim ring edge free from said retaining clips, said radially inward portion of the retaining member including a generally axially outwardly protruding shoulder spaced from the area of engagement of the retaining member by the beaded trim ring edge and engageable by the pry-off tool as a fulcrum to afford leverage for the tool.

3. In a wheel structure having a tire rim of the drop center type formed with a plurality of stepped flanges and a central load bearing portion secured to the base flange of the tire rim, a cover for the outer side of the wheel structure including a member disposed in substantially concealing relation to the tire rim and extending generally axially inwardly and radially inwardly and having a beaded inner edge, and a retaining member wedgingly engaging the tire rim and having thereon axially outwardly extending retaining clips engageable in snap-on pry-off relationship by the inner beaded edge of the cover member for retaining the cover member removably in place on the wheel, the retaining member in the portion thereof radially inwardly from the area of engagement by said beaded cover edge being formed to facilitate the insertion of a pry-off tool between the retaining member and the beaded cover edge for prying the beaded cover edge free from said retaining clips, the cover retaining clips on the retaining member being struck out integrally therefrom and with the apertures from which the clips are struck concealed behind the cover.

4. In a cover structure for use with a wheel including a flanged tire rim and a load-sustaining body part, a sheet metal retaining member having radially extending retaining fingers for retaining engagement with an intermediate generally radially inwardly facing flange of the tire rim, and a radially inner portion adapted to engage the wheel body spaced substantially radially inwardly from the juncture of the tire rim and wheel body for maintaining the portion of the retaining member between said retaining fingers and the body engaging portion spaced from the opposed portion of the wheel body whereby to accommodate variations in axial relative disposition of the outer side of the wheel body and the tire rim, said intermediate portion of the retaining member having integral clips struck therefrom and extending angularly generally axially outwardly from the intermediate portion for engaging and retaining a trim ring in substantially concealing relation to the tire rim, said intermediate portion having apertures therein left by the striking out of the clips and disposed at the radially outer sides of the clips so as to be concealed by the trim ring retained by the clips.

5. In a cover structure for use with a wheel including a flanged tire rim and a load-sustaining body part, a retaining member having radially extending retaining fingers for wedging, biting engagement with an intermediate generally radially inwardly facing flange of the tire rim, and a radially inner portion adapted to engage the wheel body spaced substantially radially inwardly from the juncture of the tire rim and wheel body for maintaining the portion of the retaining member between said retaining fingers and the body engaging portion spaced from the opposed portion of the wheel body whereby to accommodate variations in axial relative disposition of the outer side of the wheel body and the tire rim, said intermediate portion of the retaining member having means thereon for engaging and retaining a trim ring in substantially concealing relation to the tire rim comprising clips facing radially inwardly for snap-on pry-off retention of the trim ring and the retaining member having an area thereof exposed radially inwardly from said retaining clips for affording pry-off tool clearance and an engagement base to pry the cover free from said clips.

6. In a cover structure for use with a wheel including a flanged tire rim and a load-sustaining body part, a retaining member having radially extending retaining fingers for wedging, biting engagement with an intermediate generally radially inwardly facing flange of the tire rim, and a radially inner portion adapted to engage the wheel body spaced substantially radially inwardly from the juncture of the tire rim and wheel body for maintaining the portion of the retaining member between said retaining fingers and the body engaging portion spaced from the opposed portion of the wheel body whereby to accommodate variations in axial relative disposition of the outer side of the wheel body and the tire rim, said intermediate portion of the retaining member having means thereon for engaging and retaining a trim ring in substantially concealing relation to the tire rim, said retaining means being adapted for snap-on pry-off retention of the inner margin of the trim ring by engagement behind said margin, the retaining member having an annular generally axially outwardly extending reinforcing rib spaced radially inwardly from said retaining means and disposed radially outwardly from said wheel body engaging portion and being located to serve as a pry-off tool fulcrum for prying the trim ring free from the retaining member.

7. In a wheel structure including a multi-flanged tire rim and a load-sustaining body, a cover member in the form of an annulus of an extent to bear at its outer margin on the tire rim and having its inner margin located adjacent to but spaced from the wheel body radially inwardly from the juncture with the tire rim, and a generally circular retaining member having radially outer means thereon in retaining engagement with a flange of the tire rim and a radially inner portion thereof spaced radially inwardly from the inner margin of the cover member in engagement with the wheel body and maintaining the body of the retaining member between said outer rim engaging margin and said wheel body engaging portion in spaced relation to the wheel body, and generally axially outwardly extending cover retaining means on said intermediate body portion of the retaining member body and retainingly engaging the radially inner margin of the cover member and holding the cover member with the inner margin of the cover member in concealing relation to the retaining means.

8. In a wheel structure including a multi-flanged tire rim and a load-sustaining body, a cover member in the form of an annulus of an extent to bear at its outer margin on the terminal flange of the tire rim and having its inner margin located adjacent to but spaced from the wheel body radially inwardly from the juncture with the tire rim, and a generally circular retaining member having radially outer means thereon in retaining engagement with a flange of the tire rim and a radially inner portion thereof spaced radially inwardly from the inner margin of the cover member in engagement with the wheel body and maintaining the body of the retaining member between said outer rim engaging margin and said wheel body engaging portion in spaced relation to the wheel body, and generally axially outwardly extending cover retaining means on said intermediate body portion of the retaining member body and retainingly engaging the radially inner margin of the cover member and holding the cover member with the outer margin of the cover member snug against the tire rim, said retaining means comprising integral retaining clips struck out of the intermediate body portion of the retaining member and formed with cover retaining shoulders facing generally radially inwardly and axially inwardly.

9. In a wheel structure including a multi-flanged tire rim and a load-sustaining body, a cover member in the form of an annulus of an extent to bear at its outer margin on the terminal flange of the tire rim and having its inner margin located adjacent to but spaced from the wheel body radially inwardly from the juncture with the tire rim, and a generally circular retaining member having radially outer means thereon in retaining engagement with a flange of the tire rim and a radially inner portion thereof spaced radially inwardly from the inner margin of the cover member in engagement with the wheel body and maintaining the body of the retaining member between said outer rim engaging margin and said wheel body engaging portion in spaced relation to the wheel body, and generally axially outwardly extending cover retaining means on said intermediate body portion of the retaining member body and retainingly engaging the radially inner margin of the cover member and holding the cover member with the outer margin of the cover member snug against the tire rim, said retaining means comprising integral retaining clips struck out of the intermediate body portion of the retaining member and formed with cover retaining shoulders facing generally radially inwardly and axially inwardly, the portion of the retaining member between said retaining clips and said wheel-body-engaging portion having a generally axially outwardly extending reinforcing rib spaced from said retaining clips a sufficient distance to provide a pry-off tool clearance between the rib and the portion of the cover member engaged by the clips.

10. In combination in a cover assembly of the character described, a trim ring cover member and a retaining member partially concealed by the trim ring, said retaining member having means on its radially outer portion for engagement with a wheel having a tire rim to be substantially covered by the trim ring, said retaining member also including trim ring retaining means thereon engageable in assembly by the inner margin of the trim ring and concealed behind said inner margin, said retaining member having a reinforcing and pry-off tool fulcrum rib spaced radially inwardly from the inner margin of the trim ring.

11. A retaining member for a wheel cover, said member having cover retaining clips of substantial width adapted for retaining engagement with an annular portion of a wheel cover, said clips being bowed in transverse section similar to the curvature of the annular cover portion and thereby substantially stiffened, the retaining member being formed from sheet metal and the clips being integrally struck therefrom and extending from the plane of the member.

12. A retaining member for a wheel cover comprising a generally circular member including means for engagement with a vehicle wheel to the outer side of which the cover is to be applied, said member having a plurality of retaining elements thereon facing generally radially inwardly and adapted to have the inner margin of a trim ring member secured in snap-on pry-off relation for retaining the trim ring member in assembly with the retaining member and thereby in place on the wheel, the retaining member also having a pry-off shoulder located in radially inwardly spaced relation to said trim ring retaining elements and facing generally radially outwardly toward said elements.

13. A cover assembly for disposition at the outer side of a vehicle wheel including a tire rim, including a cover element for substantially concealing the tire rim and having a radially inner, generally radially outwardly directed shoulder structure, a retaining member for snap-on, pry-off attachment of the cover element, said member comprising a body portion including means for retaining engagement with the wheel to the outer side of which the cover assembly is to be applied, said body portion having intermediate the margins thereof a plurality of resilient retaining clips extending generally axially outwardly and having retaining faces directed generally radially inwardly for retaining engagement of the shoulder structure of the cover elements in resilient, tensioned snap-on, pry-off relation for retaining the cover element in assembly with the retaining member and thereby in place on the wheel, said cover element concealing said clip, said body portion of the retaining member having an area thereof located radially inwardly of said clips and providing a base for bottoming of the cover element thereagainst under the retaining engagement resilient tension of the clips.

14. In a wheel structure including a multi-flanged tire rim and a load sustaining body part, a wheel cover including a central cover portion having generally radially extending peripheral finger members lying in planes transverse to the wheel axis and retainingly engageable with the exterior surface of an intermediate flange of the tire rim, said cover portion including a flange structure at the base of and extending directly from said finger members, said flange structure having thereon retaining spring clips, and a cover annulus of a size to substantially cover the tire rim and said retaining fingers as well as said flange and said retaining spring clips and engaging said spring clips in snap-on, pry-off relationship.

15. In a wheel structure including a tire rim and a load sustaining body part wherein the tire rim has an intermediate generally radially inwardly facing flange and the wheel body has an annular reinforcing nose bulge, the tire rim and the wheel body defining a relatively large axially outwardly opening groove between the nose bulge and the said intermediate flange, a cover member having a convex portion covering the central portion of the wheel body and being closely adjacent to the latter at the radially outer side of the nose bulge, a marginal flange portion of said cover member extending in spanning relation across said axially outwardly opening wheel groove and having retaining fingers at the radially outer extremity thereof retainingly engaging said intermediate flange, and a trim ring concealing the tire rim and having its inner marginal edge engaging the said flange portion of the inner cover member, said flange portion having means thereon for retaining said trim ring edge in assembly therewith.

16. A wheel cover for disposition at the outer side of a vehicle wheel, said cover comprising inner and outer circular cover members, the outer cover member comprising an annulus of a diameter to extend in concealing relation to a portion of the inner cover member and having an inner edge engageable with the inner cover member, said inner cover member having a pry-off prominence providing a narrow ridge spaced radially inwardly from the inner edge of the outer cover member and projecting axially outwardly beyond the point of engagement of the inner cover member by said outer cover member inner edge, the area of the inner cover member radially inwardly adjacent the rib being depressed so as to limit pry-off tool engagement to the ridge and thus avoid marring adjacent exposed surface areas in the manipulation of the pry-off tool.

17. In combination in a wheel cover for disposition at the outer side of a vehicle wheel, said cover comprising an inner cover member for substantially concealing the inner portion of the wheel and including a crown area and an annular marginal area, said inner cover member being arranged for attachment to the wheel, a trim ring cover portion separably assembled with the marginal area of the inner cover member and having a reinforced inner edge in engagement with said marginal area, and retaining means on said marginal area concealed by said trim ring for retaining the inner edge of the trim ring in engagement with said inner cover marginal area in snap-on pry-off relation, said inner cover member having, in radially inwardly spaced relation to the point of engagement by said inner edge of the trim ring cover portion, an outwardly protruding annular pry-off rib affording a fulcrum for a pry-off tool, the area of the inner cover member between said rib and said crown portion being depressed and the crown portion being spaced radially inwardly from the rib for limiting pry-off pressure to the ridge of the rib to avoid marring said crown portion.

GEORGE ALBERT LYON.

REFERENCES CITED

The following references are of record in the file of this patent:

UNITED STATES PATENTS

| Number | Name | Date |
| --- | --- | --- |
| Re. 22,042 | Lyon | Mar. 3, 1942 |
| 1,664,765 | Ash | Apr. 3, 1928 |
| 1,818,447 | Baker | Aug. 11, 1931 |
| 2,183,220 | Horn | Dec. 12, 1939 |
| 2,198,057 | Lyon | Apr. 23, 1940 |
| 2,221,747 | Turner | Nov. 19, 1940 |
| 2,317,393 | Lyon | Apr. 27, 1943 |
| 2,361,406 | Lyon | Oct. 31, 1944 |
| 2,368,230 | Lyon | Jan. 30, 1945 |
| 2,368,241 | Lyon | Jan. 30, 1945 |
| 2,386,233 | Lyon | Oct. 9, 1945 |